July 24, 1951        O. RICE        2,561,415

METHOD FOR PRODUCING AMMONIUM PHOSPHATE

Filed June 23, 1948        6 Sheets-Sheet 1

Inventor
Owen Rice.
Gerald B. Tjoflat
His Attorney

O. RICE

2,561,415

METHOD FOR PRODUCING AMMONIUM PHOSPHATE

Filed June 23, 1948

INVENTOR
Owen Rice.
BY Gerald B. Tjoflat
His ATTORNEY

July 24, 1951  O. RICE  2,561,415
METHOD FOR PRODUCING AMMONIUM PHOSPHATE
Filed June 23, 1948  6 Sheets-Sheet 4

INVENTOR
Owen Rice.
BY Gerald B. Tjoflat
His ATTORNEY

Patented July 24, 1951

2,561,415

UNITED STATES PATENT OFFICE 2,561,415

METHOD FOR PRODUCING AMMONIUM PHOSPHATE

Owen Rice, Bridgeville, Pa., assignor to Hall Laboratories, Inc., a corporation of Pennsylvania Application June 23, 1948, Serial No. 34,789

16 Claims. (Cl. 23—106)

This invention relates to processes for the manufacture of ammonium phosphate having a composition corresponding substantially to the formula $NH_4PO_3$, as determined by analysis.

An object of this invention is to produce an ammonium phosphate in a dry micro-crystalline powder form which is non-hygroscopic under the temperature and atmospheric conditions encountered in storage in the various climates.

A further object of the invention is to produce a product of the type referred to above having a composition corresponding substantially to the formula $NH_4PO_3$ as determined by analysis and a definite X-ray diffraction pattern characterizing the product as a crystalline chemical compound.

A still further object of the invention is to provide a new and novel process for the production of ammonium phosphate as a dry, crystalline powder by reacting gaseous phosphorus pentoxide produced by burning elemental phosphorus with atmospheric air, and ammonia gas and cooling the gaseous-reaction product at such a rate that the ammonium phosphate produced is a dry crystalline powder and collectible on filters.

A still further object of the invention is to effect the reaction of $NH_3$ gas, atmospheric air containing water vapor, and gaseous phosphorus pentoxide while the reactants are in a gaseous phase and at such a temperature that the ammonium phosphate product is produced, and then cooling the gaseous-reaction product at such a rate that it may be collected on filters without plugging the same. Phosphorus which has been burned to phosphorus pentoxide is believed to be a polymer of $P_2O_5$ at the temperatures at which it exists as a gas. For convenience, this form of the phosphorus pentoxide also will be referred to herein as $(P_2O_5)_x$ where $x$ is an unknown, believed to be 2.

In carrying out one form of the process embodying this invention, elemental phosphorus in a molten condition is supplied to a combustion or reaction chamber to which atmospheric air containing water vapor for burning the phosphorus to phosphorus pentoxide and ammonia gas are supplied. The ammonia gas may also be reacted with the $(P_2O_5)_x$ at a point removed from the combustion or flame zone of the phosphorus provided the temperature of the $(P_2O_5)_x$ and excess air containing moisture is high enough for the gaseous phase reaction to take place and produce the crystalline ammonium phosphate in the collectible form.

The atmospheric air, which contains water vapor, is supplied to the combustion zone at a rate in excess of the rate theoretically required to burn elemental phosphorus to $(P_2O_5)_x$. There appears to be no limit to the amount of excess air that may be supplied insofar as successful performance of the process is concerned. However, as will be pointed out later in this specification, a minimum excess exists below which an ammonium phosphate product that is collectible on filter surfaces, cannot be produced.

The gaseous ammonia that is supplied to react with the water vapor in the combustion air and the gaseous phosphorus pentoxide is also fed at a rate in excess of the amount theoretically required to produce $NH_4PO_3$. The ammonium phosphate produced in the combustion or flame zone, or at a point outside the flame zone where the ammonia gas is introduced into the gaseous $(P_2O_5)_x$ in a zone removed from the flame zone, I prefer to call a gaseous-reaction ammonium phosphate product.

I have discovered that ammonium phosphate produced by the reaction of water vapor, gaseous $(P_2O_5)_x$, and $NH_3$ gas, must be quickly cooled from the gaseous state in order that the product may be rendered collectible on filters. If this gaseous-reaction product is allowed to remain at a high temperature for more than a few seconds, it decomposes to a sticky, viscous, and highly hygroscopic substance having a glassy or amorphous character. Such a product will clog the filter surfaces almost instantly and require the process to be shut down until clean filters can be substituted. Furthermore, such a product is useless for commercial purposes because it cannot be packaged or handled.

The gaseous reaction should be carried out at temperatures below about 900° F. as ammonia burns at about this temperature. The amount of excess air for a given rate of burning of phosphorus should be so adjusted that the temperature in the reaction zone does not exceed that at which ammonia burns or decomposes. The reaction product should be cooled rapidly after it has formed so that it may be collected as a dry crystalline ammonium phosphate.

Quick cooling of the gas-reaction ammonium phosphate product may be effected in several ways, for example by supplying large excesses of atmospheric air; by supplying a large excess of air and introducing liquid water, as a mist or spray, into the air; or by utilizing a large excess of air and passing the mixture of the unreacted air water vapor and $NH_3$ gas, and the gaseous-reaction product which is suspended in such mixture through a heat exchanger, which may either be air or water cooled, and thence through a filter where the product is collected. If the cooling of the gaseous-reaction product has been rapid enough, the product will collect on the filter surfaces without plugging them. If the product has not been cooled quickly enough and the glassy, sticky, hygroscopic product above described is formed, the filters will plug almost instantly. If a sufficient excess of $NH_3$ is supplied in relation to the rate at which the elemental phosphorus is being burned, and a non-collectible product is formed, it is quite certain that the rate of cooling the gaseous-reaction product is too low. This can be corrected by increasing the amount of excess air provided the cooling capacity available from excess air or from a combination of excess air and a heat exchanger are adequate. The precautions to be observed in so operating the process that a collectible ammonium phosphate may be produced, are relatively simple and are readily determinable.

If the process is to be carried out by reacting all of the reactants in a combustion space and passing the reaction products through a heat exchanger and a filter on which the ammonium phosphate product is collected, a given rate of phosphorus feed is first decided upon. This rate would ordinarily be much lower than the estimated capacity of the equipment in which the process is to be carried out. The amount of air theoretically required to burn this amount of phosphorus is then calculated. The rate at which the air is to be supplied would then be increased to a value of say 20 to 30 times the calculated theoretical value. The rate at which $NH_3$ gas is to be supplied would also be substantially in excess of the theoretical amount required to form the product $NH_4PO_3$—say 200% of theoretical. Provision should also be made for measuring the temperature of the mixture of excess air, $NH_3$ gas, water vapor and ammonium phosphate carried in suspension in such mixture just before it enters the filter.

When these calculations have been made, the air and $NH_3$ are supplied to the combustion zone, after which the phosphorus feed is started. The phosphorus burns spontaneously and generates heat at a rate of about 11,200 B. t. u. per pound. Under these conditions the gaseous-reaction product produced is cooled rapidly by reason of the huge excess of air and the cooling effect of the heat exchanger, and is collectible on the filters. The rate of feed of phosphorus is then gradually increased, the rate of feed of ammonia gas being adjusted along with it to maintain a predetermined excess, say 200% of theoretical, and the temperature of the reaction product ahead of the filters is noted. The phosphorus input may be gradually increased to a value where a non-collectible product is formed, a condition that immediately becomes known through the plugging of the filter surfaces. When plugging conditions are first noticed, the temperature should be noted, the process stopped and clean filters substituted for the plugged ones. The process may then be started up again, the rate of feed of phosphorus being decreased to a value where the temperature of the reaction product and the unreacted mixture of air and $NH_3$ entering the filters is safely below that at which plugging had previously occurred. The cost of operating the process depends in part on the amount of excess $NH_3$ used. Therefore, no more than is necessary to form a collectible product should be used. To find the minimum excess rate of $NH_3$ for the maximum phosphorus feed that has been determined as above described, the ammonia feed rate may be gradually reduced. While the ammonia feed is being reduced, the temperature of the mixture entering the filters should be noted, and the first signs of filter plugging should be watched for. When signs of plugging of the filters appear, the ammonia feed rate should be noted as this may be the minimum excess permitted. The ammonia feed rate should then be increased to a safe value above the minimum so determined, to assure trouble-free operation.

The theoretical amounts by weight of ammonia ($NH_3$) and elemental phosphorus required to produce one pound of ammonium metaphosphate is in the ratio of about 17 to 31, the necessary amount of water being assumed. In other words, for every 31 pounds of phosphorus, 17 pounds of ammonia ($NH_3$) are theoretically required. I propose to use an excess of ammonia, but at the same time employ as small an excess as can be used and still produce a satisfactory product that can be collected on filters without plugging them. The ratio of ammonia to phosphorus may vary from say about 0.65:1 to about 2:1, and in practice the ratio may be maintained between about 1.25:1 to about 2:1 on a weight basis.

In the above description, it has been assumed that when the phosphorus was burned at maximum rate, the cooling capacity of the system had been utilized fully. Thus, by observing the filters and rates of feed of phosphorus and ammonia, that rate of cooling of the gaseous-reaction $NH_4PO_3$ which is required to produce a product that is collectible on the filters may be easily obtained. Once these factors have been determined, the process can be adjusted to suit the conditions and operated continuously day in and day out without changing the relationships between the rates of feed of air, phosphorus, and $NH_3$ gas.

For a fuller understanding of the invention, reference should be had to the accompanying drawings in which.

Throughout the drawings and the specification, like reference characters indicate like parts.

Figures 1, 2, 3:
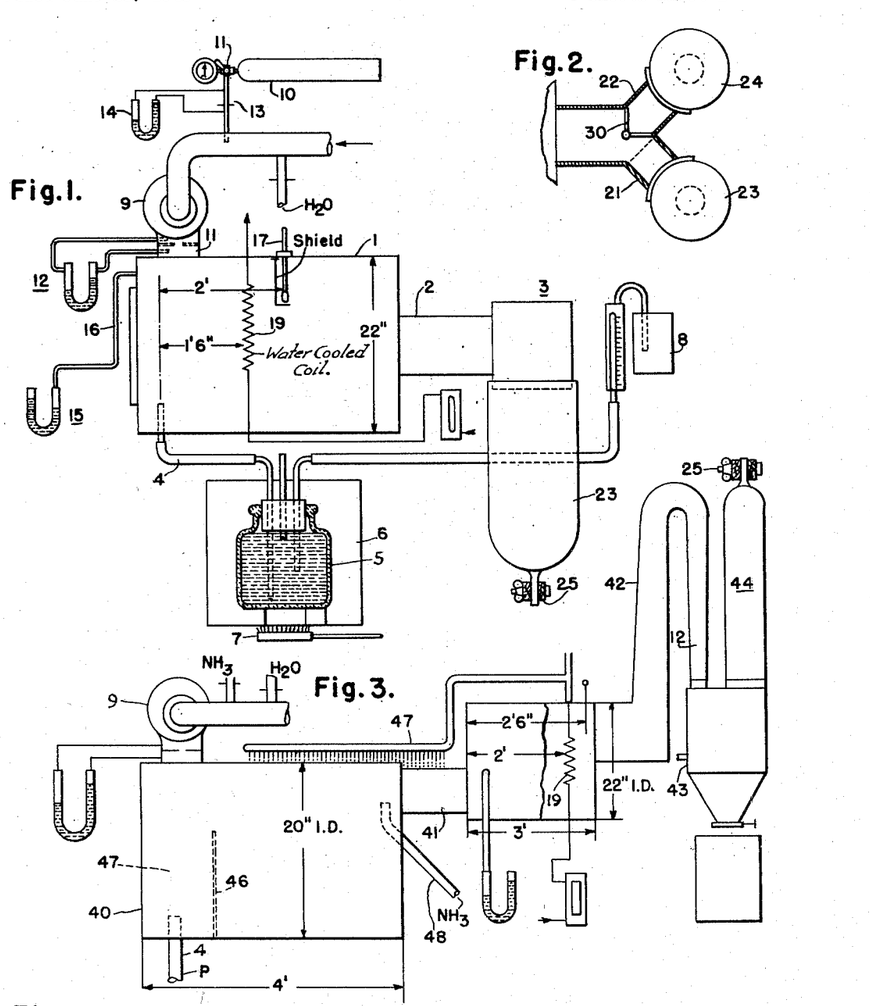
Figure 1 is a more or less diagrammatic view of the experimental apparatus that was employed in determining the conditions of operation under which a gaseous-reaction product of ammonium phosphate could be produced by reacting ammonia with the fumes of burning phosphorus in the flame zone thereof, and the water vapor present in atmospheric air which was supplied for the combustion of phosphorus and rapidly cooling the gaseous reaction product, the resulting product being one which could be collected on filter surfaces without plugging the same.
Fig. 2 is a top plan view of the filter arrangement for the apparatus shown in Fig. 1.
Fig. 3 is a more or less diagrammatic view of a modified form of apparatus wherein the ammonia gas was introduced into the gaseous $(P_2O_5)x$ at a point removed from the flame zone in order that conditions for the production of a collectible product by gas-phase reaction could be determined.
Figure 4:
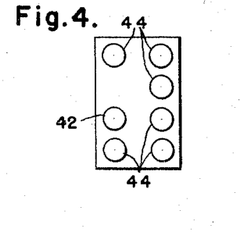
Fig. 4 is a top plan view of the filter apparatus of Fig. 3.

In Fig. 1 the apparatus illustrated with which ammonium phosphate of the ammonium metaphosphate composition was produced on an experimental basis in accordance with the invention, comprises a reactor 1, a discharge conduit 2, and a filter system 3. The reactor 1 was made from a metal drum having an inside diameter of approximately 22 inches and a length of approximately 3 feet. The elemental phosphorus was supplied through a pipe 4 to the interior of the forward end of the reactor drum from a receptacle 5, such as a glass jar. The phosphorus receptacle 5 was placed in a tank 6 and covered with water. The jar 5 in which the elemental phosphorus was contained was also filled with water. The water in tank 6 was heated by a gas burner 7 to a temperature at which elemental phosphorus was in a molten condition, so that when pressure was applied to the interior of jar 5, the phosphorus would flow to the reactor.

The elemental phosphorus was caused to flow out of the jar or bottle 5 by means of a constant head siphon 8 which supplied water to the jar or bottle 5 at a fixed but regulated rate. The air for burning the phosphorus was supplied by means of a fan or blower 9. This fan discharged the air into the reactor drum at its forward end. The ammonia gas was introduced into the suction of the fan from a steel cylinder 10 containing ammonia under pressure. The flow of ammonia from the cylinder was regulated by means of a regulating valve 11. The rate at which air was delivered to the reactor chamber and the rate at which ammonia gas was delivered to the suction of the fan was measured by means of orifices and manometers. The discharge conduit for the fan was provided with an orifice 12 and a manometer 13 measured the pressure drop across that orifice. The pipe leading from the ammonia cylinder to the suction pipe of fan 9 was provided with an orifice 14, and the pressure drop across it was measured by a water manometer 15. By means of the manometers 13 and 15, the rates at which ammonia and air were supplied to the reactor were determined.

In order that the pressures obtained in the reactor chamber could be ascertained, a water manometer 16 having a pressure connection 17 with the interior of the reactor was provided. This manometer registered changes in pressure from which it could be determined whether or not the filter surfaces were being plugged or approaching a condition where plugging could be anticipated.

In order to determine temperatures existing within the combustion chamber of the reactor, a thermometer 18 was mounted in the drum at a point about two feet removed from the flame of the burning phosphorus, a shield being employed to keep radiation of the flame away from the thermometer.

During the performance of some of the experiments, the only cooling medium for the gaseous-reaction product of ammonia, gaseous $(P_2O_5)_x$, and water vapor, was the excess air supplied by fan 9. By excess air is meant the excess of air over and above that theoretically required to burn elemental phosphorus to $(P_2O_5)_x$. In other experiments, additional cooling of the gaseous-reaction product was effected by means of a water-cooled coil 19 disposed within the drum at a distance of about eighteen inches from the center of the flame zone of the burning phosphorus.

The filter system 3 comprised a pair of ducts 21 and 22 disposed at an angle of about 45° to each other to which filter bags 23 and 24 were connected. These filter bags were made of cotton duck cloth. The lower ends of these bags were open but were held closed during operation by means of clamps 25.

The process was commenced by starting the blower or fan 9, following which the ammonia was turned on, so that a mixture of ammonia gas and air was flowing through the reactor into the filter bags. The phosphorus feed was then started and as soon as the molten phosphorus reached the combustion chamber, it spontaneously burst into flame. The ammonia gas, the $(P_2O_5)_x$ formed by the burning of the phosphorus, and the water vapor in the combustion air reacted to form, in the gaseous phase, a gaseous-reaction product, crystalline ammonium phosphate having a composition corresponding to $NH_4PO_3$. The amount of air supplied was varied from what might be regarded as a relatively small excess to a huge excess with reference to the amount of phosphorus that was being supplied to the reaction chamber during any particular experimental run. The ammonia supply was varied also from what might be regarded as a slight or small excess over and above the theoretical required to produce ammonium metaphosphate, $NH_4PO_3$, to a relatively large excess of the order of several hundred percent.

In experimenting with the process, blower 9 was operated to deliver its maximum volume of air and the ammonia was adjusted in relation to the rate of feed of phosphorus. For example, for a given feed of phosphorus, the ammonia would be adjusted to a value that would be 100% in excess of that required to produce a product corresponding to the formula $NH_4PO_3$. With the air adjusted to full volume, the phosphorus was fed to the combustion chamber, first at very low rates. The reaction product was collected on the filter bags. The product collected was a dry white crystalline powder.

The rate of feed of phosphorus was then gradually increased and the temperature in the combustion chamber as measured by the thermometer 18 was observed. As the rate of phosphorus feed was increased, the B. t. u.'s generated increased proportionately which resulted in ever increasing temperatures in the reactor drum 1. It was found that when the temperature in the reactor became too high, the gaseous-reaction product produced would be a sticky, syrupy, glass-like substance which would almost immediately plug the filter bags so that the process would have to be shut down and the bags washed to render them serviceable again. The sticky substance resulted because cooling from the high temperature phase to a temperature at which the reaction-product is stable, could not be effected rapidly enough. Cooling must be accomplished at the required rate not only to produce a stable collectible product but also to protect the filter bags against charring and burning. Cooling in the reaction zone is also necessary to prevent development of temperatures at which ammonia burns. Ammonia burns or decomposes at temperatures slightly above 900° F.

Figure 5:
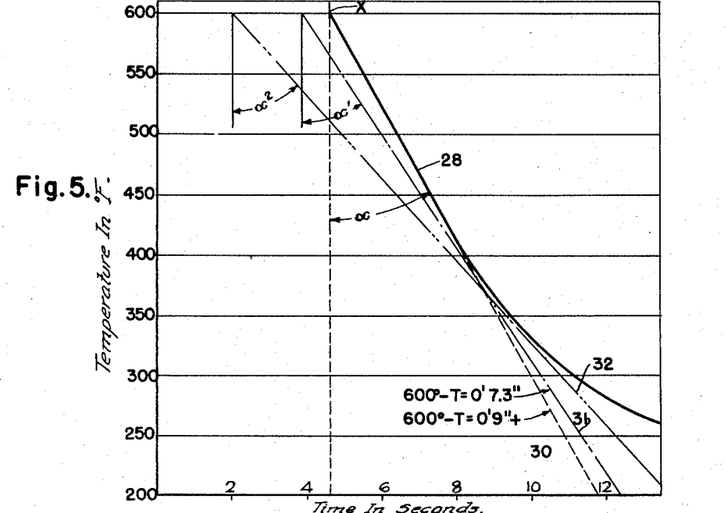
Figs. 5 and 6 are graphs showing rates of cooling of gaseous-reaction product of ammonia, air containing moisture, and gaseous $P_2O_5$ at which a dry, crystalline ammonium phosphate in powder form may be produced in collectible form on filter surfaces without plugging the same.
Figure 6:
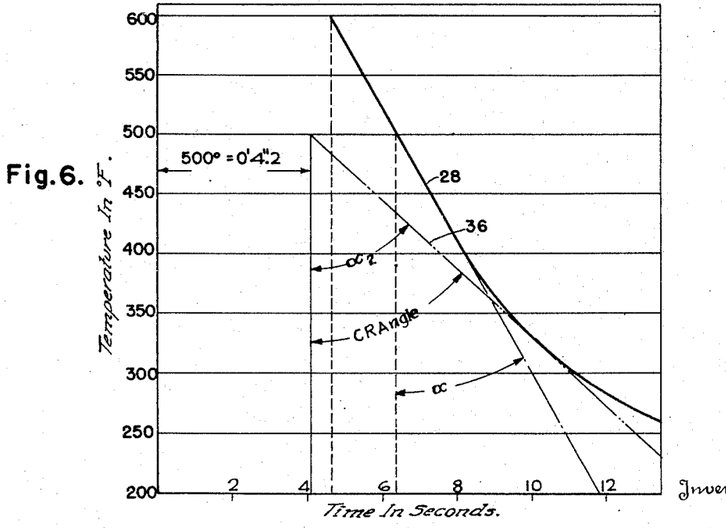

By supplying air, ammonia gas, and phosphorus to this experimental device at various rates, data were obtained from which the curves in Figs. 5 and 6 were plotted. Curves 28 in these graphs were plotted from data obtained from many trial runs. The ordinates of these curves represent the temperature as measured by thermometer 18, and the abscissae represent the time in which the gaseous-reaction product was cooled from a given temperature. These curves show that so long as the gaseous-reaction product of ammonia, burning phosphorus, and water vapor, are cooled at a rate such that the time-temperature relationship during cooling is maintained to the left of the curve, a product that was collectible on the filter bags could be produced. However, if the time-temperature relationships were such as to fall in the area to the right of the curves, a non-collectible product was obtained which plugged the filter bags almost instantly.

As is evident from Fig. 2, the product produced could be shunted to one or the other of the filter bags by means of a damper 30. Thus, whenever it was necessary to empty a bag, the gaseous-reaction product was all diverted to one bag, while the other was emptied, and vice versa. The bags were emptied as frequently as necessary to maintain the pressure in the combustion chamber at a reasonably low value so as not to cut down the volume of air delivered by the blower.

Referring again to the curves in Figs. 5 and 6, the following will indicate the necessity for observing the temperature cooling-rate relationship of the gaseous-reaction product.

In Fig. 5 are represented the cooling rates permissible for producing a product that can be collected on the filter bags without plugging them, when the temperature in the reaction zone as measured by thermometer 18 is maintained at about 600° F. If the reaction product is maintained in the reactor at 600° F. for more than about 4.6 seconds, the product decomposes, plugging the bags. Apparently when the gaseous-reaction product is held at this temperature for this period of time or longer, ammonia is released from the product and replaced by water vapor. When sufficient water vapor has been taken up in exchange for the ammonia so released, the product becomes a glass-like substance which is very sticky and hygroscopic. Such a product almost instantly plugs the filter bags. If the gaseous-reaction product is allowed to remain at about 600° F. for not more than about 4.6 seconds, it should be cooled at a rate not less than that represented by cooling-rate line 30.

As may be seen by inspection of Fig. 5, cooling-rate line 30 lies on curve 28 throughout its straight portion. The angle $a$ between this line 30 and a perpendicular dropped from the 4.6 seconds point on the curve represents an angle within which the cooling-rate line may fall to produce a collectible product. If the cooling-rate line falls outside of this angle and to the right of line 30, a non-collectible product is obtained. If the particles of ammonium phosphate are maintained at a temperature of 600° F. for a shorter time, say 3.8 seconds, the cooling-rate angle is represented by $a^1$. The lowest cooling-rate line for angle $a^1$ is designated by numeral 31. This line also is tangent to the curve 28. If the gaseous-reaction product remains at about 600° F. for about 4 seconds, the cooling-rate may be at a rate not less than that indicated by line 31, and at any higher rate represented by a line within angle $a_1$. When the cooling rate is within this angle, a collectible product is obtained. If the gaseous-reaction product is maintained at a temperature of 600° F. for a period of about 2 seconds, the cooling-rate line angle is that designated as $a^2$ and the cooling rate should be not less than about that indicated by line 32.

The cooling rates of the gaseous-reaction product are dependent on the volume of excess air supplied to the chamber in which the reaction occurs. In other words, the greater the volume of air supplied, the greater will be the volume and velocity of air passing through the reactor to the filter bags, the air containing the gaseous-reaction product, the excess ammonia and the excess water vapor which is contained in the air supplied to the reactor.

In Fig. 6, the graph illustrates the cooling rate where the maximum measured temperature in the combustion chamber of the reactor is approximately 500° F. When the temperature is not permitted to exceed about 500° F., the gaseous-reaction product can remain at this temperature for a maximum period of about between six and seven seconds before it begins to decompose or change to the glassy, sticky substance which cannot be collected on the filter bags. To avoid decomposition under these conditions the cooling rate required should be not less than the rate indicated by curve 28, and the cooling-rate angle is designated by angle $a$. If the gaseous-reaction product is maintained at a temperature of 500° F. for a period of about four seconds, the lowest cooling rate at which a collectible product can be produced is that indicated by cooling-rate line 36, and the cooling-rate angle is $a_2$. The cooling-rate lines represented by $a_2$ and $a_1$ are both tangent to curve 28 but at different points thereon.

On the curves shown in Figs. 5 and 6, it is apparent that the higher the temperature maintained in the reaction zone, the more rapidly the gaseous-reaction product must be cooled, and that when the gaseous-reaction product is maintained at a given temperature for shorter periods of time, the product may be cooled at lower rates.

From the experiments conducted with the experimental apparatus shown in Figs. 1 and 2, I found that a gaseous-reaction product could be produced satisfactorily at a temperature in the combustion chamber up to about 900° F. However, I prefer to carry out the process under conditions where the maximum temperature in the combustion chamber should not exceed 900° F. nor be substantially below 600° F. Ammonia burns or decomposes at a temperature slightly above 900° F., therefore temperatures that high should be avoided. Of course, the higher the temperature that can be safely maintained in the combustion chamber for a given installation having a given maximum cooling capacity, the more heat can be transferred by heat exchange to water cooled surfaces so that the additional cooling required can be effected by employing excess air. Since heat exchange for cooling purposes is more efficient at the higher temperatures, higher phosphorus burning rates may be practiced. The more phosphorus that can be burned in any given apparatus, the higher the rate of production will be for that apparatus.

The apparatus shown in Fig. 1 was first operated without any heat exchanger such as represented by cooling coil 19. After the maximum capacity of the apparatus had been reached with air cooling, the cooling coil was inserted within the drum and water circulated through it. The temperatures of the water at the inlet and outlet of this cooling coil were measured to determine the B. t. u. transferred to the cooling water. By utilizing the heat exchanger, it was possible to increase the feed of phosphorus and still produce an ammonium phosphate product that was collectible on the filter bags without plugging them.

In Fig. 3, a cylindrical drum 40 was mounted ahead of reactor drum 1 of Fig. 1 and the phosphorus was burned in this drum. Drum 40 was about 20 inches inside diameter and about four feet long. The outlet of this drum was connected by a pipe 41 to the front end of drum 1. The filter system was modified so that a larger number of filter bags could be used and at the same time make discharge of the phosphate product into containers more convenient.

The filter system employed in Fig. 3 comprised a U-bend 42 which was connected to the outlet of the second drum (drum 1) and this U-bend discharged into a hopper 43. The top of the hopper was provided with six bags 44 made of cotton canvas-duck. The bottom of the hopper was provided with a chute from which the product was discharged into drums. The product that was collected on the bags was removed from the bags by shaking as frequently as necessary to prevent the back pressure on blower 9 from building up too high.

The elemental phosphorus was introduced through a pipe 5' into drum 40 by the same feeding arrangement that is shown in Fig. 1.

A baffle 46 was mounted inside drum 40 to the right of the phosphorus feed pipe so as to provide a combustion chamber 47. The blower 9 was mounted to discharge the air into the combustion chamber, and ammonia was delivered to the intake of the fan in the same manner as shown in Fig. 1. The heat exchanger 19 of Fig. 1 was employed in the second drum as shown in Fig. 3, and additional cooling was provided by means of a spray pipe 47 which sprayed water over the drum 40 and pipe 41. With this arrangement, more cooling capacity was provided so that phosphorus could be burned at a higher rate in the apparatus and still produce the ammonium phosphate product that was collectible in the filter bags without plugging them.

In another experiment, the ammonia was reacted with the burning phosphorus with the gaseous $(P_2O_5)x$ at a point outside the immediate flame zone. Ammonia was introduced by pipe 48 into the outlet end of drum 40 at the point where the gaseous $(P_2O_5)x$ entered pipe 41. It was found that so long as the gaseous $(P_2O_5)x$ was maintained at a sufficiently high temperature, the ammonia and the gaseous $(P_2O_5)x$ would react to form an ammonium phosphate product of the same quality and kind as was produced in the apparatus shown in Fig. 1. In order that a collectible ammonium phosphate product may be produced under these conditions, the temperature of the $(P_2O_5)x$ should not be below about 600° F., for otherwise when the ammonia is introduced into the gaseous $(P_2O_5)x$, a sticky non-collectible product is likely to result. So long as the $(P_2O_5)x$ is hot enough to be in gaseous form rather than in what appears to be a phosphoric acid state, the reaction which results in a collectible product will take place.

It was observed by temperature measurement that when the ammonia reacted with the gaseous $(P_2O_5)x$, there was substantial heat of reaction as the temperature increased by about 100° to 150° F. above the temperature that existed at a point ahead of the place where the ammonia entered the gaseous $(P_2O_5)x$.

From the operation of the experimental apparatus shown in Figs. 1 and 3, it was found that such limiting conditions as were required to be observed in order to obtain a collectible ammonium phosphate product were readily determinable from the character of the end product. These limiting conditions can be determined by following the operating steps suggested below for the type of reaction illustrated in Fig. 1. First, one would supply to the apparatus all the air that the blower could supply. Second, the ammonia should be introduced into the air stream in quantity greatly in excess of that required to react with the $(P_2O_5)x$ to form the ammonium phosphate product which analyzes according to the formula $NH_4PO_3$. Next, the phosphorus feed is turned on and the temperature was measured at the point where the gaseous-reaction product, excess air, and excess ammonia in which it would be suspended, enters the filter system. If the product resulting is collectible on the filter bags, the phosphorus feed is increased, and if a collectible product results, the phosphorus feed is again increased. By continuing the increase of the phosphorus feed in small increments, a point will finally be reached where a non-collectible product will be produced. This point was reached when cooling of the reaction product was not accomplished rapidly enough. The deficiency in cooling occurred because the capacity for cooling had been exceeded. When a non-collectible product was produced and the bags plugged, the temperature at which that condition occurred and the rate of feed of phosphorus at that moment were observed. When plugging occurred, operation of the process was stopped. After cleaning the bags so as to render them operable, the process was started up, but the phosphorus feed was kept below that rate at which the plugging had occurred in the previous run. This could readily be determined by observing the temperature in the drum and keeping the rate of feed of phosphorus at a value where the plugging temperature would not be reached.

When the ammonia is introduced into the gaseous $(P_2O_5)x$ as described in connection with Fig. 3, the phosphorus feed and the amount of excess air should be so adjusted as to develop such a temperature at the point of ammonia addition, that the $(P_2O_5)x$ will be in a gaseous rather than in a phosphoric acid state, a collectible ammonium phosphate product may be produced. The temperature of the gaseous $(P_2O_5)x$ can be measured and by adjusting the phosphorus feed and the amount of excess air, a desired temperature can be maintained at the point where the ammonia is added. Also the temperature of the air laden product at the entrance to the filter system should be measured to determine whether the rate of cooling the ammonium phosphate product is sufficient and also to protect the filter bags against burning or charring. When the relationships of the reactants air, moisture in the air, ammonia and gaseous $(P_2O_5)_x$ which result in a collectible ammonium phosphate product, have been determined, the process is on an operating basis.

In the operation of the process such as above described, the plugging condition is a useful indicator. It is useful because it not only determines whether too much phosphorus is being burned for the cooling capacity of the system, but whether the amount of ammonia supplied is too low, or whether or not too much water vapor has been introduced into the reactants for the gaseous-reaction product.

In the experiments performed by the apparatus shown in Figs. 1 and 3, I also introduced into the air supply, liquid water as a mist, in addition to that which was contained in the atmospheric air. Within the limited capacity of the apparatus, I found that an excess of moisture as high as 900% did not impair the proper functioning of the system. When I say 900% excess water, I mean an amount of water which is 10 times greater than the amount theoretically required to produce $NH_4PO_3$ from the theoretical amounts of $(P_2O_5)_x$ and $NH_3$. I have found that by introducing water in addition to that contained in the air, a considerable cooling effect is obtained which increases the cooling capacity of the system. This added water may be supplied by spraying it into the air stream ahead of the combustion chamber or it may be sprayed into the combustion chamber.

Figure 7A:
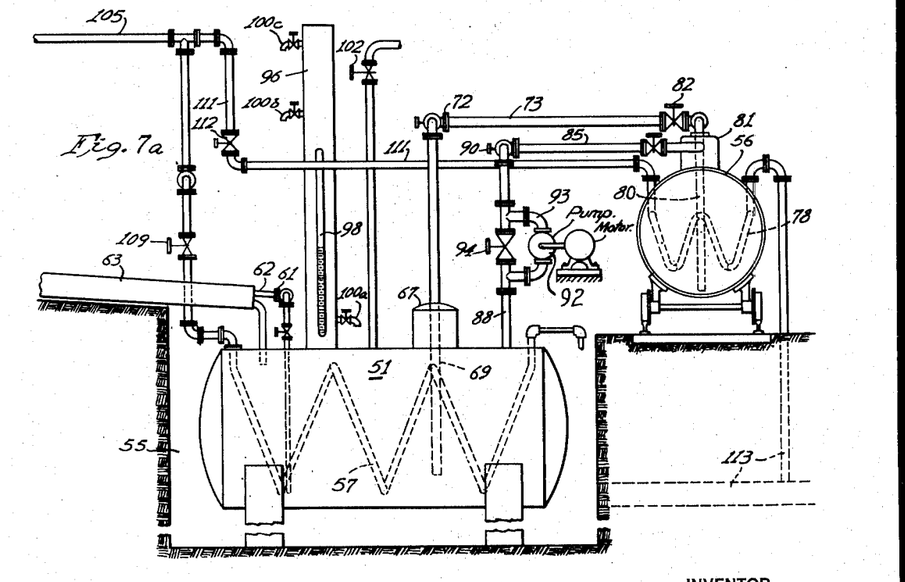
Figs. 7a, 7b, and 7c are views in side elevation, partly in section, of sections of apparatus for carrying out the process on a commercial scale, these views when placed end to end representing the complete diagrammatic arrangement of the apparatus.
Figure 7B:
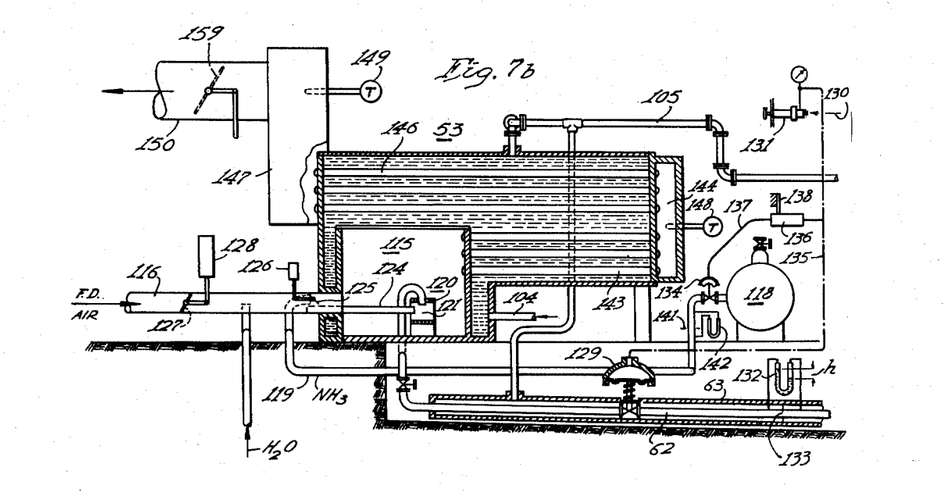
Figure 7C:
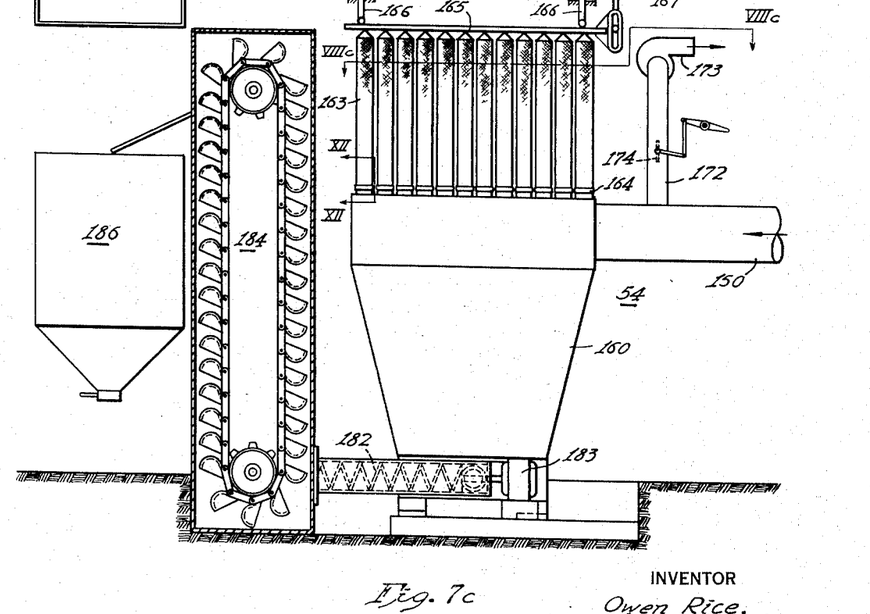

From the data obtained by the experimental apparatus shown in Figs. 1 and 3, apparatus, such as that indicated by Figs. 7a to 7c inclusive, and 8a to 8c inclusive, was designed for carrying out the process on a larger scale.

In Figs. 7a, 7b, and 7c and the corresponding top plan views 8a, 8b, and 8c, I have illustrated tanks 51 and 52 for storing elemental phosphorus, a fire tube boiler 53 in which the elemental phosphorus is burned and reacted with ammonia, gas, and water vapor contained in the combustion air, and a filter system 54 in which the ammonium phosphate product is collected.

The phosphorus storage tanks 51 and 52 are mounted in a pit 55 of such depth and volume that if by accident either or both storage tanks should leak, the elemental phosphorus would be trapped in the pit and covered with the water that is always maintained in the pit. Storage tanks 51 and 52 are so arranged that while phosphorus is being supplied to the reactor 53 from one of these tanks, the other tank can be refilled with phosphorus directly from a tank car 56.

Each of the storage tanks 51 and 52 is provided with a heating coil 57 through which hot water is circulated to maintain the phosphorus in a molten condition.

Figure 8A:
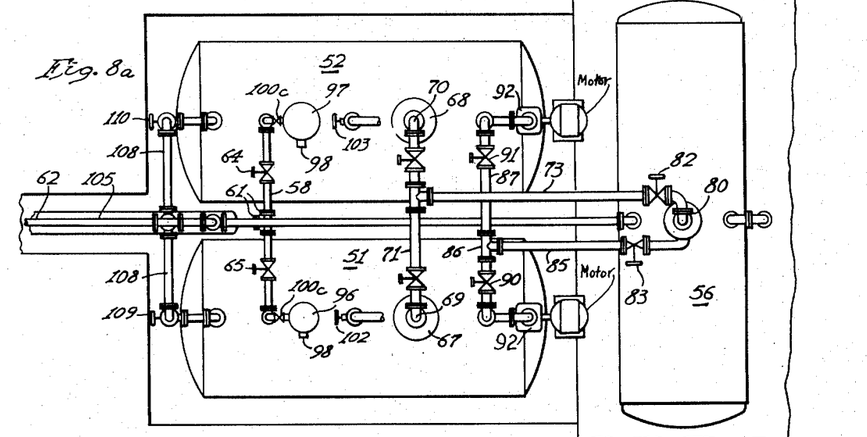
Figs. 8a, 8b, and 8c are top plan views of the apparatus shown in Figs. 7a, 7b, and 7c respectively.

As is shown more clearly in Fig. 8a, tanks 51 and 52 are provided with a header 58, the opposite ends of which are connected to pipes 59 and 60 that extend downwardly through the top of the tanks to points near the bottoms thereof. A T 61 is provided in the header to which a pipe 62 is connected that supplies phosphorus to the combustion chamber of the reactor 53. Pipe 62 is disposed in a housing 63 through which hot water flows to maintain the phosphorus in the feed pipe 62 in a liquid condition.

Valves 64 and 65 are provided in header 58 so that phosphorus may be drawn from either tank by opening one of these valves and closing the other. Storage tanks 51 and 52 are provided with domes 67 and 68 respectively. Riser pipes 69 and 70 extend through these domes and downwardly into the tank and their upper ends are connected by a header 71 having a T 72 therein to which a pipe 73 is connected and through which the elemental phosphorus flows from the tank car 56 when the same is being unloaded.

Header 71 is provided with valves 74 and 75 disposed on opposite sides of T 72, so that by closing one of them and opening the other, phosphorus may be unloaded into either tank 51 or tank 52.

The tank car 56 is provided with the customary heating coils 78 through which hot water or steam is passed to heat and melt the phosphorus so that it may be displaced by water and caused to flow therefrom into the storage tanks. An unloading pipe 80 extends through dome 81 of the car and downwardly into the same with its discharge end near the bottom of the car. The upper end of this pipe is connected by a valve 82 to the phosphorus unloading pipe 73. The water used to force the phosphorus out of the tank car into the unloading pipe 73 enters the dome 81 through a valve 83. This water is forced into the tank car from one or the other of the tanks 51 and 52, whichever is to be filled with elemental phosphorus, through a pipe 85. Pipe 85 is connected to a T 86 and a header 87, the opposite ends of which are connected to riser pipes 88 and 89 that communicate with the interior of tanks 51 and 52 respectively.

Valves 90 and 91 are provided in header 87 on opposite sides of T 86 so that by closing one of these valves and opening the other, phosphorus may be caused to flow to one or the other of tanks 51 and 52. A pump 92 may be provided in a by-pass 93 associated with riser pipe 88, a valve 94 being provided in the riser so that when it is closed, the pump will pump water out of tank 51 and into the tank car 56 to initiate flow of phosphorus from the tank car into tank 51. It is to be noted that if tank 51 has been emptied of phosphorus and is to be refilled, that the tank will be full of water. As this water is pumped into the tank car, phosphorus will flow out of it into tank 51. When this flow has started, valve 94 may be opened to permit siphoning action to unload phosphorus from the car into tank 51. A similar pump by-pass and valve may be provided in riser 89 to be used when tank 52 is to be filled with phosphorus.

Tanks 51 and 52 may be provided with standpipes 96 and 97 respectively, in which the water level may be carried at predetermined heights depending upon the rate at which it is desired to feed phosphorus from the storage tanks to the reactor 53. Gauge glasses 98 and 99 may be provided for indicating the head of water on each of these tanks.

In order to facilitate controlling the pressure head of water in either phosphorus tank 51 or 52, the standpipes 96 and 97 are each provided with a plurality of overflow valves 100a, 100b, 100c respectively. If any one of these valves is opened, the others being closed, and water is introduced into the tanks, the water level will rise until it flows out the open valve. If the flow of water into the tanks is adjusted to equal the amount overflowing through the open valve, the pressure head on the phosphorus will be constant.

Water for displacing phosphorus in the storage tanks is introduced through supply pipes 101a and 101b respectively, having valves 102 and 103 therein for adjusting the rate of flow of water in the tanks. The supply pipes 101a and 101b may be extended to the reactor 53 or some other convenient point with the valves 102 and 103 located at such points so that the water level in the tanks 51 and 52 may be conveniently adjusted.

The water employed for heating the phosphorus in the tank car 56 is supplied from the reactor 53 when the process is in operation. Water enters the water space of the reactor from a supply pipe 104 and the hot water is discharged therefrom through a pipe 105. The amount of heat generated by the burning of the phosphorus and the reaction between the phosphorus fumes and the ammonia, under ordinary conditions, is sufficient to supply the hot water necessary for operation of the process. Hot water from the reactor is also directed into housing 63 by a pipe 106 to keep the phosphorus in the feed pipe 62 in a fluid condition.

Figure 8B:
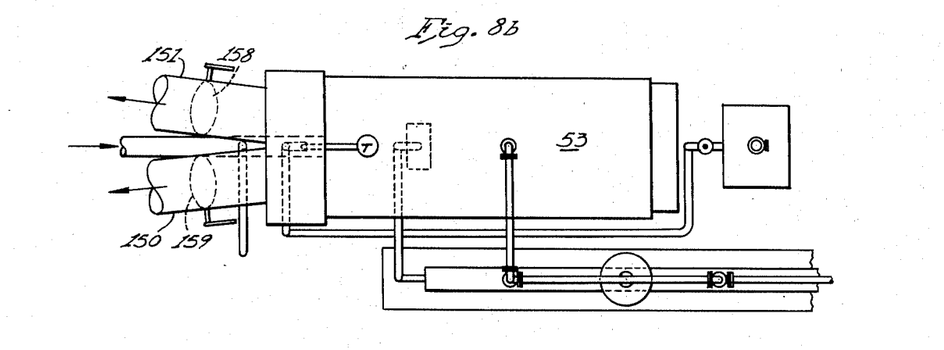

As shown in Figs. 7a and 8b, pipe 105 is connected by a pipe 107 to a lateral 108 the opposite ends of which are connected to the heating coils in the storage tanks 51 and 52. Valves 109 and 110 are provided in the lateral so that hot water can be delivered to either or both of the heating coils 57. Pipe 105 also supplies the heating coil 78 in the tank car being connected thereto by a pipe 111 in which a valve 112 is provided.

The water passing through the heating coils of tanks 51 and 52 and of car 56 discharges into pit 55 and a drain 113 respectively, the drain also taking the overflow from the pit.

It will be observed by inspection of Figs. 7a to 7c inclusive that the phosphorus storage tanks are mounted at a lower level than the fire box 115 of the reactor 53, so that in case of a shutdown of the plant, or in case a break occurs in the phosphorus feed pipe 62, the phosphorus will flow back into the storage tank, or if any escapes from the feed pipes, the same will flow into the pit 55 where it will sink and be covered with water and rendered harmless from the standpoint of fire or spontaneous burning in the air.

The reactor 53 may comprise a fire tube boiler because of its relatively simple construction. The size of this boiler in terms of rating, such as boiler horse power capacity, may be as large or as small as desired. The capacity of boiler selected for the apparatus shown in the drawings was approximately an 80 horse power. This boiler was modified by sealing up the fire box so as to provide a tight combustion chamber 115.

Air for burning the phosphorus may be supplied by a plurality of blowers (not shown) through what would be the fire door of the boiler by means of a conduit 116.

The ammonia required in the process is stored in a storage tank 118 from which it is delivered to the reactor through a feed pipe 119. In order that the ammonia may be thoroughly mixed with the air delivered to the reactor chamber 115, the discharge end of the ammonia feed pipe 119 is disposed in pipe 116.

The phosphorus feed pipe 62 delivers the phosphorus to a burner 120 in the reactor chamber 115.

Figures 9, 10:
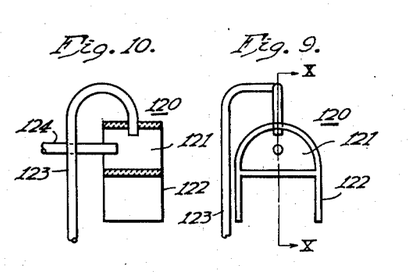
Fig. 9 is an end view of the phosphorus burner shown in Fig. 7b.
Fig. 10 is a view in section taken on lines X—X of Fig. 9.

Burner 120 comprises a tunnel 121 of refractory material having side walls 122 which support the tunnel in spaced relation to the floor or house of chamber 115. The vertical run 123 of the phosphorus feed pipe 62 is disposed at one side and to the rear of the tunnel. The upper end of run 123 is bent horizontally and then downwardly with the discharge end of the pipe extending through the roof of the tunnel.

To provide primarily air for the phosphorus, a pipe 124 is provided. One end of this pipe projects into the air pipe 116 and the opposite end extends into the tunnel and is so positioned that air is directed at the tip of the phosphorus pipe that extends into the tunnel. In order to regulate or adjust the flow of air through pipe 124, a damper 125 is placed in the discharge end of air supply pipe 116. Damper 125 may be positioned by an operator 126 such as an air cylinder, for example.

The total flow of air both secondary, (the air which passes damper 125) and primary air may be adjusted by a damper 127 and a damper operator 128 such as a power cylinder, for example. In order that the rate of flow of phosphorus to combustion chamber 115 may be regulated, a diaphragm operated valve 129 is provided in phosphorus feed pipe 62. This valve is operated by pressure such as compressed air supplied from a supply pipe 130. The particular value of pressure supplied to the diaphragm chamber of valve 129 is under the control of a hand sender or regulator 131 such as disclosed in U. S. Patent No. 2,304,782. While the regulator may be of the type shown in this patent, any suitable pressure sending device may be employed. The rate of flow of phosphorus through the pipe 62 may be determined by a meter such as an indicating manometer 132 that measures the pressure drop across an orifice 133 in the feed pipe. The pressure differential as measured by this meter is a measure of the flow of phosphorus.

The rate of flow of ammonia to the combustion chamber may be regulated by means of a diaphragm operated valve 134 disposed in the ammonia feed pipe 119. The pressure supplied to the diaphragm chamber of this valve may also be derived from the pressure sent out by the sender 131 through the sending line 135. In order that the rate of flow of ammonia with respect to the rate of flow of phosphorus may be adjusted so that the ratio of the rate of flow of one to the other may be varied as required in the operation of the process, a ratio relay 136 is interposed between the sending line 135 and the diaphragm chamber of the valve 134. The ratio relay 136 receives pressure from line 135 and depending on the adjustment of the relay 136, this relay transmits a loading pressure to the diaphragm chamber of valve 134 through a line 137. The pressure sent out through line 137 is derived from a supply source 138 such as compressed air. The ratio relay indicated may be of the type shown in U. S. Patent No. 2,304,783. While I have indicated a ratio relay of the type shown in this patent, it is to be understood that any relay which will provide a ratio of any desired but predetermined value between the loading pressures transmitted to the diaphragms of valves 134 and 129 according to the requirements of the process, may be employed.

In order that the rate of flow of ammonia through pipe 119 to the combustion chamber may be determined, a meter may be provided that measures the pressure drop across an orifice 141 in pipe 119. The meter may be of the manometer type such as indicated at 142. When an operator is operating the process, he judges the relative rates of flow of ammonia and phosphorus by observing the readings on the manometers 142 and 132 respectively.

When the process is in operation, the secondary and primary air being supplied to the furnace as above described and the phosphorus being delivered to the burner 120, the phosphorus burns vigorously and forms a gaseous phosphorus pentoxide. The ammonia which is introduced with the air and the water vapor contained in the air react with this gaseous phosphorus pentoxide to form ammonium phosphate which is crystalline in form and has by analysis a composition corresponding to ammonium metaphosphate, $NH_4PO_3$. In the combustion chamber, the reaction product resulting is at a high temperature depending on the amount of excess air that is supplied. The rate at which phosphorus is burned in the combustion chamber and the amount of excess air supplied are so adjusted that the temperature in this chamber will not reach the value at which ammonia burns or decomposes. Ammonia decomposes or burns at temperatures slightly above 900° F. and it is therefore necessary to stay below this temperature. The reaction product formed in the combustion chamber passes through the fire tubes 143 of the first pass to a smoke box 144 from which it enters a bank of fire tubes 146 of the second pass into the outlet smoke box 147 of the furnace. The reaction product formed in the combustion chamber is cooled partially by radiant heat given up to the fire box walls which are water cooled and a substantial amount of this heat is given up to water surrounding the fire tubes 143 in the first pass. As the product passes through the second pass consisting of the fire tubes 146, it is further cooled. The amount of excess air supplied also takes up a large part of the heat and effects cooling of the product.

Figure 8C:
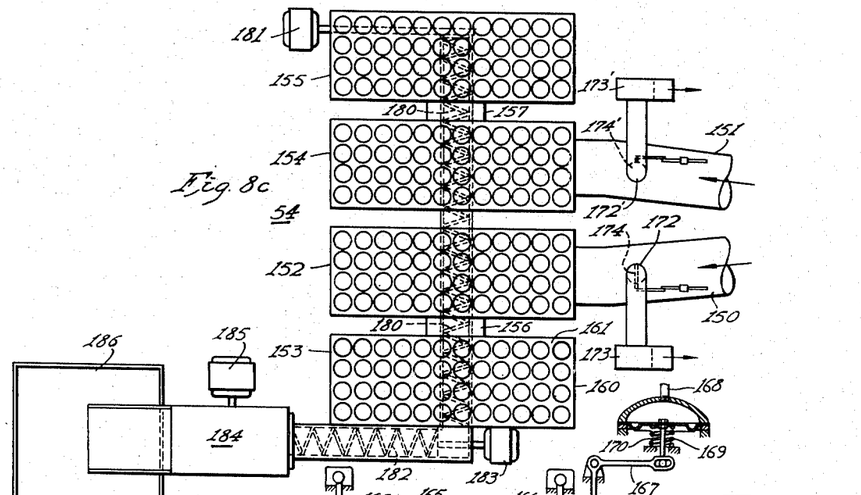

In operating the process, I prefer to measure the temperature in the smoke box 144 and in the smoke box 147 so that it may be ascertained whether or not the reaction product has been cooled quickly enough to prevent decomposition of the product into the sticky glassy-like substance heretofore described. The temperature may be measured in the smoke box 144 by means of a thermometer, either an indicating or recording thermometer such as indicated at 148. The temperature in the outlet smoke box 147 may be measured by a thermometer 149. This thermometer may be either an indicating or a recording thermometer. The reaction product leaves the smoke box 147 through one or the other of pipes or conduits 150 and 151. Pipe 150 supplies units 152 and 153 of the filter system 54 while pipe 151 supplies units 154 and 155 respectively thereof. As shown in Fig. 8c, units 152 and 153 are connected by a pipe 156, and units 154 and 155 are connected by a pipe 157.

When the ammonium phosphate reaction product is delivered to units 152 and 153 of the filter system, a damper 158 in pipe 151 is closed so that the accumulation of product in units 154 and 155 may be unloaded or removed from the filtering elements. Likewise, when product is supplied through pipe 151 to units 154 and 155 a damper 159 in pipe 150 is closed so that the product accumulated in the filter elements of units 152 and 153 may be dislodged therefrom.

The filter units 152 through 155 inclusive are similar in construction; therefore, only unit 153 need be described as this is illustrated quite plainly in Fig. 7c. The filter unit 153 comprises a hopper 160 made of sheet metal or other suitable material which is pressure tight so as to avoid leakage of the fine ammonium phosphate reaction product delivered to it. The top of the hopper is closed by a suitable cover plate 161 in which is formed a plurality of openings each having a vertical flange 162 associated therewith and to which the lower end of a filter such as a filter bag 163 may be secured by means of a clamp 164 (see Fig. 12). Filter bags 163 may be made of cloth or fabric of suitable material. I have found that cotton duck is a suitable material for the filter bags as is nylon also. Both of these materials are resistant to the temperatures encountered and are durable. The nylon material appears to be more durable than cotton, but either nylon or cotton is suitable for the purpose.

As illustrated in Figs. 7c and 8c, each of the units 152 through 155 inclusive includes about 48 filter bags. The number of filter bags employed per unit will depend on the permeability of the filter bag material and the total amount of product that has to be filtered.

The upper ends of the filter bags may be connected to a support member 165 suspended from links 166 in such manner that the support member 165 may be oscillated. The mechanism for oscillating the support member 165 may be of any suitable form or type. As illustrated schematically, the mechanism may include a crank arm 167 that is connected to one end of the support member 165. One arm of the crank is connected to a diaphragm operator 168 to which pressure may be applied intermittently to provide a downstroke that turns crank 167 clockwise, the return or up-stroke being accomplished by a compression spring 169. This up and down motion of the diaphragm is transmitted through a push rod 170 to the bell crank and results in an oscillatory motion of the support member 165 with a corresponding motion of the bags.

As is well understood in this art, bags of this type can not be shaken when pressure is on them. Therefore, when the bags of the pairs of units 152—153 and 154—155 are to be shaken, the pressure to them is cut off. Thus, for example, if the bags of units 152—153 are to be shaken, the damper in pipe 150 is closed and the interior of the hoppers 160 of units 152—153 and the bags are connected to atmosphere by means of a pipe 172 to which, if desired, an exhaust fan 173 may be connected to insure that there will be no tension on the bags because of pressure. A damper 174 is provided in pipe 172 so that when the bags of units 152—153 are to be shaken, and damper 150 has been closed as aforesaid, the damper 174 is moved to open position and fan 173 exhausts air from the bags and hoppers of units 152—153. Thus, when the shaker operator 168 is supplied with intermittent pressure, the bags will be deflected back and forth with the motion of the support 165 and any material adhering to them will be dislodged and fall into the hoppers.

When the bags of units 154—155 are to be shaken, damper 172 in pipe 174 is closed, damper 159 is opened, and damper 158 in pipe 151 is closed. When the damper 158 is closed, a damper 174' provided in a pipe 172' communicating with the interior of pipe 151 is opened so that a fan 173' may exhaust the bags and the hoppers associated with units 154—155, thereby to relieve these units of pressure from within, and permitting the bags to be flexed by the shaker operator.

As may be seen from Figs. 7c and 8c, I have illustrated a shaking mechanism only for the unit 153, but it is to be understood that each of the units 152, 154, and 155 is provided with similar shaking units and operated as above described when necessary to free the bags of the ammonium phosphate reaction product that may be adhering to the inner surfaces thereof.

The material falling into and collecting in the hoppers 160 discharges into a conveyor 180 extending centrally under all of them. This conveyor may be of any suitable type such as a screw conveyor and driven by a motor 181. Conveyor 180 delivers the phosphate product to a conveyor 182 driven by a motor 183 whereby the product is carried to an elevator 184. Elevator 184 is driven by a motor 185 and carries the product to a hopper 186 from which it may be discharged at the bottom thereof into bags or other containers for shipment or storage.

The apparatus employed for removing the product from the hoppers 160 of the filter units may of course be materially different in design from that schematically illustrated in the drawings. This matter is largely a question of choice and selection dictated by the needs of a particular plant.

In the arrangement shown in Figs. 7a–7c, and Figs. 8a–8c, the air supplied for combustion of the phosphorus, cooling the ammonium phosphate product, and conveying it to the filter units, is all supplied by forced draft fans located ahead of the reactor 53. In other words, the system is under pressure. It may be desirable to use both pressure and vacuum on the system to make the system more flexible and to facilitate control of pressures in the reaction chamber 115. To use both pressure and vacuum, i. e. forced and induced draft on the system, I may modify the filter system shown in Figs. 7c and 8c in the manner indicated in Fig. 11.

Figures 11, 12:
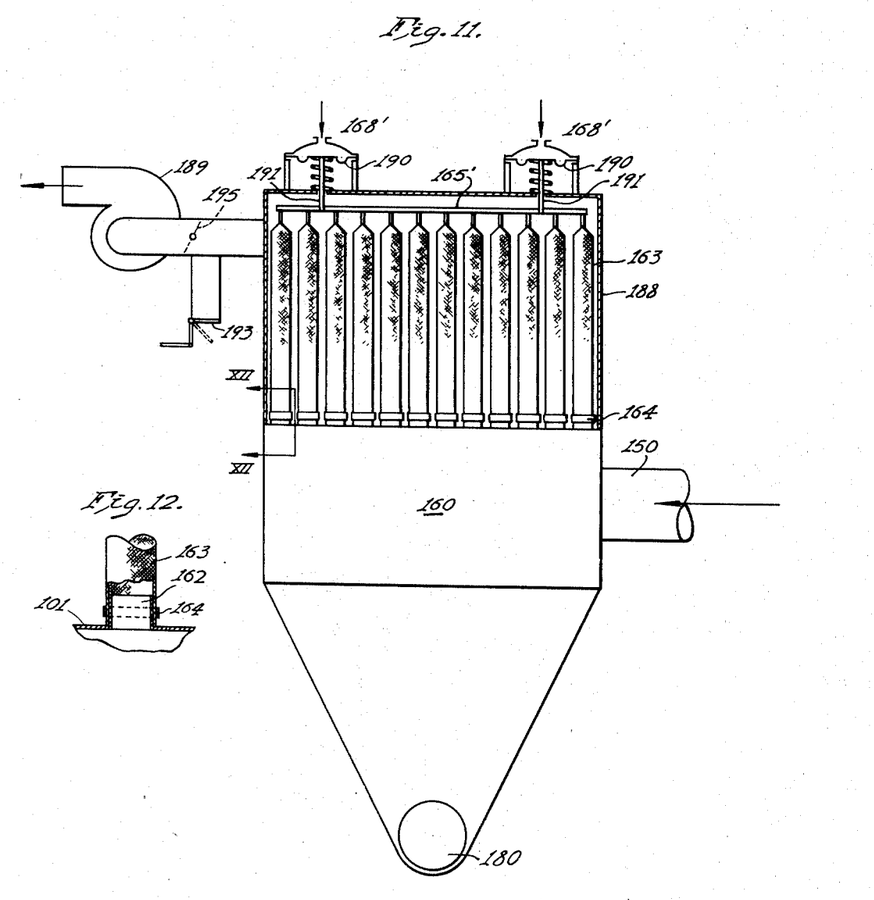
Fig. 11 is a view partly in section of a modified form of product collecting apparatus.
Fig. 12 is a view in section taken on line XII—XII of Fig. 11.

In Fig. 11, the filter bags of each filter unit are enclosed in a pressure tight housing 188 connected to an exhaust or induced draft fan 189. Fan 189 reduces the pressure on the outside of the filter bags and assists in drawing the ammonium phosphate reaction product and the excess air in which it is suspended through the reactor, the intervening piping, and the bags. By adjusting the induced draft operating on the housings of the filter bags in relation to the air supplied by the forced draft fans to the combustion chamber of the reactor, the pressure in the reaction chamber of the reactor and at points between the reactor and the filter system may be adjusted.

As shown in Fig. 11, the bags of each filter unit may be shaken to remove the product that adheres to the inner surfaces thereof, by means of a diaphragm unit 168' mounted on the top of the housing. These units are so arranged that their respective diaphragms 190 are connected to the bag support members 165' by push rods 191. When pressure is applied to the diaphragm chambers, the push rods move downwardly and are returned by compression springs 192 when the pressure is released. By applying pressure intermittently to these diaphragm chambers, bags 163 are flexed and shaken.

The flexing of the bags is accomplished when the pressure on the unit has been cut off as by closing one or the other of dampers 150 and 151 closing damper 194 at the suction side of fan 189, and opening a flapper valve 193 in a pipe 194 connected to the intake of the exhaust fan whereby the pressure inside and outside the bags is equalized at atmospheric. Thus, when the pressure is removed from the filter bags, they are flexible and in condition for flexing and shaking by the shaker-diaphragm operators 168'.

The process for making ammonium phosphate above described may be started up and carried on in various ways but the following procedure is suggested:

1. The phosphorous in the storage tank should be heated up to a temperature of about 150–170° F. to insure that the phosphorus is molten and in a fluid condition. This can be accomplished by circulating hot water through the heating coils in the tank. Until the process has been started up and hot water is available from the reactor, the necessary hot water can be supplied from an auxiliary heater (not shown).

2. The water in the reactor should also be heated up as by circulating hot water through it from an auxiliary heater.

3. The forced draft fans are started up and adjusted to supply say 200 or more percent of air in excess of that required theoretically to burn the phosphorus at the rate it will be supplied to the reactor chamber.

4. Either damper 150 or 151 leading to the filter unit is closed while the other is held open depending on which filter unit is to be put in operation first.

5. Ammonia is turned on, by opening valve 134, at a rate that will provide an excess over the requirements for the production of ammonium metaphosphate, $NH_4PO_3$, say 100% excess based on the rate at which the phosphorus will be fed to the burner of the reactor.

6. Water is run into the phosphorus storage tank until the desired pressure head on the phosphorus is obtained.

7. The phosphorus control valve 129 in the feed line 62 is opened by supplying pressure to the diaphragm thereof, the valve being opened only a little at first. When the phosphorus flows into the burner, it burns spontaneously.

8. The phosphorus feed valve is then opened gradually to increase the rate of burning.

9. The temperatures indicated by thermometers 148 and 149 are observed.

10. The phosphorus feed rate may be increased until the maximum temperature desired in the outlet smoke box 147 is reachd. This temperature should not exceed 400–475° F.

When the maximum phosphorus feed rate has been reached, the ratio relay 136 is adjusted until the ammonia feed has been reduced to a minimum excess over the theoretical requirement for the reaction to result in $NH_4PO_3$, say about 25% of excess. After this relay has been adjusted, adjustments in the rate of feed if both phosphorus and ammonia may be made simultaneously without disturbing the desired ratio of ammonia to phosphorus by merely turning the hand wheel of the sender relay 131.

When a given rate of operation has been reached, the temperature at the outlet smoke box 147 can be controlled by adjusting the secondary air supplied to either increase or decrease the excess of air. The more excess air supplied, the more the reaction product is cooled, with consequent reduction in temperature in both of smoke boxes 144 and 147. The temperature in smoke box 144 should always be below 900° F. and ought not to exceed 650° F. If this temperature is exceeded, the probabilities are that the temperature in the combustion or reaction chamber will be so high as to cause burning or decomposition of the ammonia.

During starting up and running of the process, the condition of the phosphate product should be observed. If a glassy sticky product forms, the filter bags will plug almost instantly. This is an indicator or warning that either too much phosphorus is being burned with inadequate cooling, that there is not enough water in the air to allow the reaction to proceed to ammonium metaphasphate, $NH_4PO_3$, or that insufficient ammonia is being supplied to the reaction chamber. By adjusting the rates of air, ammonia, and phosphorus supplied to the reactor until the proper cooling rates are achieved and a collectible product is obtained, operating conditions can be established for a continuous operating process that will result in a collectible ammonium phosphate product being formed.

If the air is too dry and not enough moisture is available for the reaction to produce $NH_4PO_3$, moisture may be added as steam or as a mist or spray to the air supply duct 116. This process will function with large excesses of water in the reaction chamber and the excess does not appear to be critical with respect to successful operation of the process. However, the process is critical with respect to deficient moisture, so care should be taken to insure that the minimum theoretical amount of water is available in the reaction chamber to allow complete reaction to take place between the water, phosphorus pentoxide, and ammonia.

Also, in operating the process, the temperature cooling rate data indicated by the curves in Figs. 5 and 6 should be followed as this data indicates the rate at which the ammonium phosphate product, once it has been formed, must be cooled from a high temperature down to a temperature at which the product is stable with respect to atmospheric conditions. While the upper temperature limits indicated in Figs. 5 and 6 are in the neighborhood of 600° F. it is to be understood that the temperature may be carried upwardly to near 900° F. provided cooling is accomplished rapidly enough with excess air and supplementary heat exchange.

The filter units should be alternated in the collection of the product. Shaking of the bag filters should be done as often as necessary. If the pressure in the combustion space in the reactor rises to a value above a maximum desired value or the total flow of air decreases, that is an indication that the bags are becoming too impervious to the flow of air and require shaking. The alternating shaking of the bags may be done on a scheduled cycle, if that is desired, so that each bag will be shaken every few minutes, say every four or five minutes. Operation of the process will indicate whether more or less frequent shaking is necessary.

From the foregoing it will be apparent to those skilled in this particular art that various modifications and changes may be made in the practice of the process without departing either from the spirit or the scope of the invention. Therefore, what I claim and desire to secure by Letters Patent is:

1. A method of producing ammonium metaphosphate as a dry free-flowing powder that consists in supplying air containing moisture and elemental phosphorus to a combustion chamber at such ratios relative to each other that the phosphorus is burned to gaseous phosphorus pentoxide and supplying the phosphorus and air to said combustion chamber at such rates that the temperature developed in said chamber by said combustion is above 600° F., introducing ammonia into the phosphorus pentoxide formed in said chamber and the water vapor mixed therewith in such amounts that the ammonia and water vapor react with all the gaseous phosphorus pentoxide to form ammonium metaphosphate while the reactants are in the gas phase, continuously discharging the excess air and ammonium metaphosphate so formed into a filter, and cooling the ammonium metaphosphate and air at such a rate that the temperature thereof is reduced from the temperature at which the metaphosphate is formed in the gas phase to a temperature in the filter at which the ammonium metaphosphate remains stable as a dry free flowing powder, in a cooling time period not exceeding 8 seconds.

2. A method according to claim 1 characterized by the fact that the ammonia gas is supplied at a rate in excess of the amount theoretically required to produce $NH_4PO_3$ and the air is supplied at a rate substantially in excess of the amount theoretically required to burn elemental phosphorus to phosphorus pentoxide to effect cooling of the ammonium metaphosphate gaseous-reaction product, and, prior to filtering, passing the air laden with $NH_4PO_3$ through a heat exchanger to cool the air and thereby further cool the particles of $NH_4PO_3$ suspended therein.

3. A method according to claim 1 characterized by the fact that cooling of the gaseous reaction product is effected by supplying atmospheric air to the combustion chamber at a rate greatly in excess of the rate theoretically required to burn elemental phosphorus to phosphorus pentoxide at the rate at which it is fed to the combustion chamber.

4. A method according to claim 1 characterized by the fact that the ammonium phosphate reaction product and the excess air and ammonia are conducted from the combustion chamber through a heat exchanger to further cool the ammonium phosphate reaction product prior to filtering.

5. A method according to claim 1 characterized by the fact that cooling of the gaseous reaction product is effected by supplying atmospheric air to combustion chamber at a rate greatly in excess of the rate theoretically required to burn elemental phosphorus to phosphorus pentoxide at the rate at which it is fed to the combustion chamber, and that prior to filtering, conducting the excess air and ammonia and the phosphate reaction product suspended therein, through a heat exchanger.

6. A method of producing a dry, crystalline ammonium phosphate having a ratio of $(NH_4)_2O$ to $P_2O_5$ of about 1:1, which comprises feeding elemental phosphorus to a combustion zone, supplying atmospheric air to said zone at a rate at least equal to 300% in excess of the theoretical air required to burn the phosphorus to phosphorus pentoxide, supplying to said zone concomitantly with the supply of air, ammonia gas in amount not less than about 30% in excess of the amount theoretically required to form $NH_4PO_3$, causing said excess air and ammonia containing the said reaction product, to flow to a filter in which the reaction product is collected and separated from said air and excess ammonia gas, and so regulating the rates of feed of phosphorus and air relative to one another that the temperature of the reaction product is reduced from the temperature existing at the combustion zone to a value of about 400° F at the filter in such a period of time that the reaction product does not change from a dry powder to a sticky glass-like mass which adheres to and plugs the filter surfaces of the filter.

7. A method of producing a dry, crystalline ammonium phosphate having a composition corresponding essentially to $NH_4PO_3$ which comprises feeding phosphorus to a combustion zone, supplying atmospheric air to said zone at a rate at least equal to 300% in excess of the theoretical air required to burn phosphorus to phosphorus pentoxide, supplying to said zone concomitantly with the supply of air, ammonia gas at a rate not less than about 30% in excess of the amount theoretically required to form $NH_4PO_3$, passing the gaseous reaction product and the excess air and ammonia in which it is suspended through a heat exchanger wherein the air and ammonia are cooled thereby cooling the particles of ammonium phosphate suspended therein, causing said ammonia and the reaction product and excess air to flow from said heat exchanger to a filter in which the reaction product is collected and separated from said air and ammonia, and so regulating the relative rates of feed of phosphorus and air that the temperature of the reaction product is reduced from the temperature existing at the combustion zone to a value of about 400° F. at the filter in such a period of time that the reaction product does not change from a dry powder to a sticky glass-like mass which would adhere to and plug the filter surfaces of the filter.

8. The method of producing ammonium phosphate as a dry crystalline powder, which comprises feeding elemental phosphorus to a combustion zone, supplying atmospheric air containing water and ammonia gas to said zone to form while in a gas phase, a reaction product of ammonia, water vapor, and phosphorus pentoxide, the air being supplied at a rate equal to at least 300% of the theoretical amount of air required to burn phosphorus to phosphorus pentoxide, the ammonia being supplied at a rate equal to at least 30% in excess of the amount required to form with the gaseous phosphorus pentoxide a product having a composition corresponding substantially to that of $NH_4PO_3$, passing said ammonium phosphate reaction product while in suspension in said excess air to a collector containing air pervious filter surfaces, measuring the temperature of the air and gas stream with its entrained ammonium phosphate at a point adjacent the collector, varying the cooling rate of said ammonium metaphosphate by adjusting the rate of feed of phosphorus relative to the rate of supply of air until the said phosphate converts to a sticky glass-like material and plugs the filter surfaces of said collector, observing the temperature of the phosphate and air entering said collector at which said conversion occurs, and so regulating the relative rates of supply of phosphorus and air to said chamber that the temperature of the air and phosphate product entering said collector is below the value at which plugging of the filter surfaces occurs.

9. A method according to claim 8 characterized by the fact that the air supply is maintained at a value between about 150% to 1000% in excess of the theoretical amount of air required to burn phosphorus to phosphorus pentoxide, that a ratio between the rate of feed of ammonia gas and phosphorus is maintained at between about 1.25:1 to about 2:1 on a weight basis, and that the rate of feed of phosphorus is so regulated that the temperature of the air and ammonia gas containing therein the ammonium phosphate in suspension, as it leaves the heat exchanger, is below the value at which the ammonium phosphate decomposes to a sticky glass-like product.

10. The method of producing ammonium phosphate as a dry crystalline powder, which comprises feeding elemental phosphorus to a combustion zone, supplying atmospheric air and ammonia gas to said zone to form while in a gaseous phase, a reaction product of ammonia, water vapor, and phosphorus pentoxide the air being supplied at a rate equal to at least 300% of the theoretical amount of air required to burn phosphorus to phosphorus pentoxide, the ammonia being supplied at a rate equal to at least 30% in excess of the amount required to form with the gaseous phosphorus pentoxide, a product having a composition corresponding essentially to that of $NH_4PO_3$, passing the gaseous ammonium phosphate reaction product and the excess air and ammonia through a heat exchanger to cool said air and ammonia and thereby cool the ammonium phosphate suspended therein, passing said ammonium phosphate reaction product while in suspension in said excess air to a collector containing air pervious filter surfaces, varying the relative rates of feed of phosphorus, and air, measuring the temperature of the air and gas stream with its entrained ammonium phosphate as it leaves the heat exchanger, determining the temperature of said stream at which the filter surfaces of said collector become plugged by the conversion of said ammonium phosphate powder to a sticky glass-like material, and regulating the relative rates of supply of phosphorus and air to said chamber to such a value that the temperature of the air and phosphate product as it leaves the heat exchanger is below the value at which plugging of the filter surfaces occurs.

11. A method of producing ammonium phosphate as a dry crystalline product having a composition corresponding substantially to the formula $NH_4PO_3$ comprising supplying phosphorus and atmospheric air containing moisture to a combustion chamber, so regulating the amount of air supplied relative to the amount of phosphorus supplied that there is a substantial excess of air over the amount required to effect both a conversion of the phosphorus to phosphorus pentoxide and cooling of the phosphorus pentoxide to a temperature between about 900° F. and 600° F. introducing ammonia into the combustion chamber in amount in excess of the theoretical amount required to react with phosphorus pentoxide and water vapor to form $NH_4PO_3$ continuously removing the reaction product, excess air and ammonia from the combustion chamber, and cooling the ammonium phosphate product from the temperature at which it is formed to a temperature below about 400° F. to 450° F. at such a rate that the product does not decompose to a sticky substance, and collecting said ammonium phosphate product by passing the same through filters.

12. A method according to claim 11 characterized by the fact that the ammonia and elemental phosphorus are supplied at such rates that the ratio of ammonia to phosphorus is between about 1.25:1 to about 2:1 on a weight basis.

13. A method according to claim 11 characterized by the fact that water as such is supplied to the combustion chamber in amount sufficient to compensate for deficiency of moisture in the atmospheric air supplied to said chamber and required for the reaction resulting in NH4PO3.

14. A process of producing crystalline ammonium metaphosphate as a free-flowing powder by gas phase reaction between water vapor, gaseous phosphorus pentoxide and ammonia gas that consists in continuously supplying molten elemental phosphorus and atmospheric air containing moisture to a combustion chamber at such rates relative to each other, that the phosphorus is burned to gaseous phosphorus pentoxide, cooling the water vapor and the gaseous phosphorus pentoxide formed in said combustion chamber by introducing air into the same at such a rate as to maintain the temperature in said combustion chamber within a range of about 600° F. to about 900° F., continuously introducing ammonia gas into said cooled gaseous phosphorus pentoxide and water vapor at a rate sufficient to effect a gas phase reaction of the ammonia and the water vapor with all of the gaseous phosphorus pentoxide at the rate at which it is formed in said chamber to form ammonium metaphosphate, continuously removing the ammonium metaphosphate and excess air in which it is entrained from the reaction zone and cooling the same from the temperature existing at the time of said reaction to a temperature of about 400% F. to 450° F. in a period of time not exceeding about eight seconds measured from about the instant the ammonium metaphosphate is formed in said gas phase reaction, separating said crystalline ammonium metaphosphate powder from the excess air and ammonia and collecting the same in a collector.

15. A process of producing crystalline ammonium metaphosphate as a free-flowing powder by gas phase reaction between water vapor, gaseous phosphorus pentoxide and ammonia gas that consists in continuously supplying molten elemental phosphorus and atmospheric air containing moisture to a combustion chamber at such rates relative to each other, that the phosphorus is burned to gaseous phosphorus pentoxide, cooling the water vapor and the gaseous phosphorus pentoxide formed in said combustion chamber by introducing air into the same at such a rate as to maintain the temperature in said combustion chamber within a range above about 600° F. and below the temperature at which ammonia gas decomposes in the presence of gaseous phosphorus pentoxide and water vapor, continuously introducing ammonia gas into said cooled gaseous phosphorus pentoxide and water vapor at a rate sufficient to effect a gas phase reaction of the ammonia and the water vapor with all of the gaseous phosphorus pentoxide at the rate at which it is formed in said chamber to form ammonium metaphosphate, continuously removing the ammonium metaphosphate and excess air in which it is entrained from the reaction zone and cooling the same from the temperature existing at the time of said reaction to a temperature of about 400° F. to 450 F. in a period of time not exceeding about eight seconds measured from about the instant the ammonium metaphosphate is formed in said gas phase reaction, separating said crystalline ammonium metaphosphate powder from the excess air and ammonia and collecting the same in a collector.

16. A process of producing crystalline ammonium metaphosphate as a free-flowing powder by gas phase reaction between water vapor, gaseous phosphorus pentoxide and ammonia gas that consists in continuously supplying molten elemental phosphorus and atmospheric air containing moisture to a combustion chamber at such rates relative to each other, that the phosphorus is burned to gaseous phosphorus pentoxide, cooling the water vapor and the gaseous phosphorus pentoxide formed in said combustion chamber by introducing air into the same at such a rate as to maintain the temperature in said combustion chamber within a range of about 600° F to about 900° F., continuously introducing ammonia gas into said cooled gaseous phosphorus pentoxide and water vapor at a rate sufficient to effect a gas phase reaction of the ammonia and the water vapor with all of the gaseous phosphorus pentoxide at the rate at which it is formed in said chamber to form ammonium metaphosphate, continuously removing the ammonium metaphosphate and excess air in which it is entrained from the reaction zone and cooling the same from the temperature existing at the time of said reaction to a temperature of about 400° F. to 450° F. in a period of time not exceeding about eight seconds measured from about the instant the ammonium metaphosphate is formed in said gas phase reaction, and passing the cooled air and the entrained ammonium metaphosphate through air-pervious filters whereby the ammonium metaphosphate is separated from said air and collected.

OWEN RICE.

REFERENCES CITED

The following references are of record in the file of this patent:

UNITED STATES PATENTS

| Number | Name | Date |
|---|---|---|
| 1,194,077 | Ross et al. | Aug. 8, 1916 |
| 1,514,912 | Klugh | Nov. 11, 1924 |
| 2,142,943 | Kerschbaum | Jan. 3, 1939 |
| 2,280,848 | Pole | Apr. 28, 1942 |